(12) United States Patent
Xie et al.

(10) Patent No.: US 8,178,476 B2
(45) Date of Patent: May 15, 2012

(54) PROPPANT HAVING A GLASS-CERAMIC MATERIAL

(75) Inventors: Yuming Xie, Houston, TX (US); Dilip Chatterjee, Houston, TX (US); Christopher E. Coker, Houston, TX (US); Christopher Y. Fang, Missouri City, TX (US)

(73) Assignee: Oxane Materials, Inc., Houston, TX (US)

( * ) Notice: Subject to any disclaimer, the term of this patent is extended or adjusted under 35 U.S.C. 154(b) by 0 days.

(21) Appl. No.: 12/967,784

(22) Filed: Dec. 14, 2010

(65) Prior Publication Data

US 2011/0146985 A1 Jun. 23, 2011

Related U.S. Application Data

(60) Provisional application No. 61/289,014, filed on Dec. 22, 2009.

(51) Int. Cl.
*C09K 8/62* (2006.01)
*C04B 35/00* (2006.01)

(52) U.S. Cl. ........... 507/269; 427/255.11; 501/1; 501/4; 501/152; 501/153; 501/154; 507/273; 507/274; 507/276; 507/904; 507/906

(58) Field of Classification Search .................. 507/269, 507/273, 274, 276, 904, 906; 427/255.11; 501/1, 4, 152, 153, 154
See application file for complete search history.

(56) References Cited

U.S. PATENT DOCUMENTS

| | | | |
|---|---|---|---|
| 3,365,315 A | 1/1968 | Beck et al. | |
| 3,794,503 A | 2/1974 | Netting | |
| 3,796,777 A | 3/1974 | Netting | |
| 3,888,957 A | 6/1975 | Netting | |
| 3,960,583 A | 6/1976 | Netting et al. | |
| 4,111,713 A | 9/1978 | Beck | |
| 4,303,061 A | 12/1981 | Torobin | |
| 4,303,431 A | 12/1981 | Torobin | |
| 4,303,432 A | 12/1981 | Torobin | |
| 4,303,433 A | 12/1981 | Torobin | |
| 4,303,730 A | 12/1981 | Torobin | |
| 4,303,731 A | 12/1981 | Torobin | |
| 4,303,732 A | 12/1981 | Torobin | |
| 4,303,736 A | 12/1981 | Torobin | |
| 4,349,456 A | 9/1982 | Sowman | |
| 4,415,512 A | 11/1983 | Torobin | |
| 4,420,442 A | 12/1983 | Sands | |
| 4,421,562 A | 12/1983 | Sands | |
| 4,427,068 A | 1/1984 | Fitzgibbon | |
| 4,440,866 A | 4/1984 | Lunghofer et al. | |
| 4,493,875 A | 1/1985 | Beck et al. | |
| 4,547,468 A | 10/1985 | Jones et al. | |
| 4,632,876 A | 12/1986 | Laird et al. | |
| 4,637,990 A | 1/1987 | Torobin | |
| 4,639,427 A | 1/1987 | Khaund | |
| 4,641,709 A | 2/1987 | Powers et al. | |
| 4,654,266 A | 3/1987 | Kachnik | |
| 4,668,645 A | 5/1987 | Khaund | |
| 4,671,909 A | 6/1987 | Torobin | |
| 4,680,230 A | 7/1987 | Gibb et al. | |
| 4,698,317 A | 10/1987 | Inoue et al. | |
| 4,725,390 A | 2/1988 | Laird et al. | |
| 4,743,545 A | 5/1988 | Torobin | |
| 4,744,831 A | 5/1988 | Beck | |
| 4,764,218 A | 8/1988 | Kobayashi et al. | |
| 4,777,154 A | 10/1988 | Torobin | |
| 4,790,688 A | 12/1988 | Castor | |
| 4,793,980 A | 12/1988 | Torobin | |
| 4,869,960 A | 9/1989 | Gibb et al. | |
| 4,881,951 A | 11/1989 | Wood et al. | |
| 4,894,285 A | 1/1990 | Fitzgibbob | |
| 4,917,857 A | 4/1990 | Jaeckel et al. | |
| 4,919,866 A | 4/1990 | Kubbutat | |
| 4,921,820 A | 5/1990 | Rumpf et al. | |
| 4,921,821 A | 5/1990 | Rumpf et al. | |
| 4,923,714 A | 5/1990 | Gibb et al. | |
| 4,944,905 A | 7/1990 | Gibb et al. | |
| 4,954,462 A | 9/1990 | Wood et al. | |
| 4,964,883 A | 10/1990 | Morris et al. | |
| 4,977,116 A | 12/1990 | Rumpf et al. | |
| 4,983,550 A | 1/1991 | Goetz et al. | |
| 5,017,523 A | 5/1991 | Kimura et al. | |
| 5,071,635 A | 12/1991 | Yamanaka et al. | |
| 5,120,455 A | 6/1992 | Lunghofer | |
| 5,183,493 A | 2/1993 | Brandau et al. | |
| 5,185,299 A | 2/1993 | Wood et al. | |
| 5,188,175 A | 2/1993 | Sweet | |
| 5,212,143 A | 5/1993 | Torobin | |
| 5,219,806 A | 6/1993 | Wood | |
| 5,225,123 A | 7/1993 | Torobin | |
| 5,240,654 A | 8/1993 | Smith et al. | |
| 5,240,894 A | 8/1993 | Burkhardt et al. | |
| 5,282,875 A | 2/1994 | Wood et al. | |
| 5,318,382 A | 6/1994 | Cahill | |
| 5,322,821 A | 6/1994 | Brezny | |
| 5,326,513 A | 7/1994 | Kubbutat | |

(Continued)

FOREIGN PATENT DOCUMENTS

EP 0 102 761 A1 3/1984

OTHER PUBLICATIONS

International Search Report and Written Opinion for PCT/US2010/060029, dated Feb. 11, 2011, twelve pages.
U.S. Statutory Invention Registration No. H1447, Howard R. Linton, published Jun. 6, 1995, eleven pages.
U.S. Appl. No. 12/961,629, filed Dec. 7, 2010 to Smith et al.

*Primary Examiner* — Timothy J. Kugel

(74) *Attorney, Agent, or Firm* — Kilyk & Bowersox, P.L.L.C.

(57) ABSTRACT

The present invention relates to glass-ceramic proppants which can be used to prop open subterranean formation fractions, as well as other uses. Proppant formulations are further disclosed which use one or more proppants of the present invention. Methods to prop open subterranean formation fractions are further disclosed. In addition, other uses for the proppants of the present invention are further disclosed, as well as methods of making the glass-ceramic proppants.

76 Claims, 4 Drawing Sheets

U.S. PATENT DOCUMENTS

| | | | |
|---|---|---|---|
| 5,352,254 A | 10/1994 | Celikkaya | |
| 5,397,759 A | 3/1995 | Torobin | |
| 5,420,086 A | 5/1995 | Branduau et al. | |
| 5,472,648 A | 12/1995 | Alisch et al. | |
| 5,474,583 A | 12/1995 | Celikkaya | |
| 5,489,318 A | 2/1996 | Erickson et al. | |
| 5,496,386 A | 3/1996 | Broberg et al. | |
| 5,516,348 A | 5/1996 | Conwell et al. | |
| 5,534,348 A | 7/1996 | Miller et al. | |
| 5,547,479 A | 8/1996 | Conwell et al. | |
| 5,645,619 A | 7/1997 | Erickson et al. | |
| 5,669,941 A | 9/1997 | Peterson | |
| 5,690,707 A | 11/1997 | Wood et al. | |
| 5,708,039 A | 1/1998 | Daly et al. | |
| 5,728,184 A | 3/1998 | Monroe | |
| 5,739,368 A | 4/1998 | Krzystowczyk et al. | |
| 5,750,459 A | 5/1998 | Marella et al. | |
| 5,779,743 A | 7/1998 | Wood | |
| 5,893,935 A | 4/1999 | Wood | |
| 5,899,256 A | 5/1999 | Rohatgi | |
| 5,908,478 A | 6/1999 | Wood | |
| 5,921,317 A | 7/1999 | Dewprashad et al. | |
| 6,048,470 A | 4/2000 | Nakahara et al. | |
| 6,139,960 A | 10/2000 | Styron et al. | |
| 6,197,073 B1 | 3/2001 | Kadner et al. | |
| 6,206,942 B1 | 3/2001 | Wood | |
| 6,210,625 B1 | 4/2001 | Matsushita et al. | |
| 6,211,109 B1 | 4/2001 | Shamshoum et al. | |
| 6,258,456 B1 | 7/2001 | Meyer | |
| 6,322,890 B1 | 11/2001 | Barron et al. | |
| 6,330,916 B1 | 12/2001 | Rickards et al. | |
| 6,369,183 B1 | 4/2002 | Cook et al. | |
| 6,372,678 B1 | 4/2002 | Youngman et al. | |
| 6,406,789 B1 | 6/2002 | McDaniel et al. | |
| 6,409,650 B2 | 6/2002 | Bruno et al. | |
| 6,492,024 B1 | 12/2002 | Walter | |
| 6,528,446 B1 | 3/2003 | Stensrud | |
| 6,572,697 B2 | 6/2003 | Gleeson et al. | |
| 6,582,819 B2 | 6/2003 | McDaniel et al. | |
| 6,632,527 B1 | 10/2003 | McDaniel et al. | |
| 6,632,528 B1 | 10/2003 | Clough | |
| 6,667,261 B1 | 12/2003 | Anshits et al. | |
| 6,713,177 B2 | 3/2004 | George et al. | |
| 6,746,636 B2 | 6/2004 | Meyer | |
| 6,772,838 B2 | 8/2004 | Dawson et al. | |
| 6,780,804 B2 | 8/2004 | Webber et al. | |
| 6,805,737 B2 | 10/2004 | Godeke et al. | |
| 6,806,236 B2 | 10/2004 | Frenier et al. | |
| 6,832,654 B2 | 12/2004 | Ravensbergen et al. | |
| 6,913,827 B2 | 7/2005 | George et al. | |
| 6,916,891 B2 | 7/2005 | Salem et al. | |
| 6,962,200 B2 | 11/2005 | Nguyen et al. | |
| 6,983,797 B2 | 1/2006 | Nguyen et al. | |
| 7,032,664 B2 | 4/2006 | Lord et al. | |
| 7,036,591 B2 | 5/2006 | Cannan et al. | |
| 7,036,592 B2 | 5/2006 | Nguyen et al. | |
| 7,066,258 B2 | 6/2006 | Justus et al. | |
| 7,135,231 B1 | 11/2006 | Sinclair et al. | |
| 7,160,844 B2 | 1/2007 | Urbanek | |
| 7,220,454 B2 | 5/2007 | Barron et al. | |
| 7,459,209 B2 | 12/2008 | Smith et al. | |
| 7,491,444 B2 | 2/2009 | Smith et al. | |
| 7,867,613 B2 | 1/2011 | Smith et al. | |
| 7,883,773 B2 | 2/2011 | Smith et al. | |
| 7,887,918 B2 | 2/2011 | Smith et al. | |
| 2002/0025436 A1 | 2/2002 | Meyer | |
| 2002/0114941 A1 | 8/2002 | Franke et al. | |
| 2002/0128142 A1 | 9/2002 | Godeke et al. | |
| 2003/0026989 A1 | 2/2003 | George et al. | |
| 2003/0148893 A1 | 8/2003 | Lunghofer et al. | |
| 2003/0150185 A1 | 8/2003 | Godeke et al. | |
| 2003/0167797 A1 | 9/2003 | Schmid et al. | |
| 2003/0180537 A1 | 9/2003 | Meyer | |
| 2003/0203205 A1 | 10/2003 | Bi et al. | |
| 2003/0203207 A1 | 10/2003 | Pessey et al. | |
| 2004/0012105 A1 | 1/2004 | Deppe et al. | |
| 2004/0040708 A1 | 3/2004 | Stephenson et al. | |
| 2004/0069490 A1 | 4/2004 | Cannan et al. | |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0105980 A1 | 6/2004 | Sudarshan et al. | |
| 2004/0200617 A1 | 10/2004 | Stephenson et al. | |
| 2004/0224155 A1 | 11/2004 | Barron et al. | |
| 2004/0231844 A1 | 11/2004 | Nguyen et al. | |
| 2004/0251573 A1 | 12/2004 | Schmid | |
| 2004/0262801 A1 | 12/2004 | Hojaji et al. | |
| 2004/0266933 A1 | 12/2004 | Friedman et al. | |
| 2005/0006095 A1 | 1/2005 | Justus et al. | |
| 2005/0016726 A1 | 1/2005 | Nguyen et al. | |
| 2005/0022991 A1 | 2/2005 | Rao | |
| 2005/0028979 A1 | 2/2005 | Brannon et al. | |
| 2005/0061509 A1 | 3/2005 | Nguyen | |
| 2005/0089631 A1 | 4/2005 | Nguyen et al. | |
| 2005/0096207 A1 | 5/2005 | Urbanek | |
| 2005/0194141 A1 | 9/2005 | Sinclair et al. | |
| 2005/0244641 A1 | 11/2005 | Vincent | |
| 2005/0272611 A1 | 12/2005 | Lord et al. | |
| 2005/0284630 A1 | 12/2005 | Nguyen et al. | |
| 2006/0006589 A1 | 1/2006 | Canova et al. | |
| 2006/0016598 A1 | 1/2006 | Urbanek | |
| 2006/0035790 A1 | 2/2006 | Okell et al. | |
| 2006/0065398 A1 | 3/2006 | Brannon et al. | |
| 2006/0073980 A1 | 4/2006 | Brannon et al. | |
| 2006/0078682 A1 | 4/2006 | McDaniel et al. | |
| 2006/0081371 A1 | 4/2006 | Duenckel et al. | |
| 2006/0113080 A1 | 6/2006 | Nguyen et al. | |
| 2006/0151170 A1 | 7/2006 | Brannon et al. | |
| 2006/0162929 A1 | 7/2006 | Urbanek | |
| 2006/0177661 A1 | 8/2006 | Smith et al. | |
| 2006/0219600 A1 | 10/2006 | Palamara et al. | |
| 2006/0240967 A1 | 10/2006 | Hojaji et al. | |
| 2006/0258546 A1 | 11/2006 | Brannon et al. | |
| 2006/0272816 A1 | 12/2006 | Willberg et al. | |
| 2007/0021308 A1 | 1/2007 | Berger et al. | |
| 2007/0023187 A1 | 2/2007 | Canova et al. | |
| 2007/0036977 A1 | 2/2007 | Sinclair et al. | |
| 2007/0054054 A1 | 3/2007 | Svoboda et al. | |
| 2007/0062699 A1 | 3/2007 | Alary et al. | |
| 2007/0072776 A1 | 3/2007 | Crews | |
| 2007/0083331 A1 | 4/2007 | Craig | |
| 2007/0084602 A1 | 4/2007 | Curimbaba et al. | |
| 2007/0087941 A1 | 4/2007 | Cawiezel | |
| 2007/0099793 A1 | 5/2007 | Wilson | |
| 2007/0114030 A1 | 5/2007 | Todd et al. | |
| 2007/0166541 A1 | 7/2007 | Smith et al. | |
| 2007/0172654 A1 | 7/2007 | Leidolph et al. | |
| 2007/0172655 A1 | 7/2007 | Leidolph et al. | |
| 2007/0173417 A1 | 7/2007 | Kaufman et al. | |
| 2007/0202318 A1 | 8/2007 | Smith et al. | |
| 2007/0204992 A1 | 9/2007 | Davis et al. | |
| 2007/0209794 A1 | 9/2007 | Kaufman et al. | |
| 2008/0009425 A1 | 1/2008 | Pershikova | |
| 2008/0015103 A1 | 1/2008 | Luscher et al. | |
| 2008/0058228 A1 | 3/2008 | Wilson | |
| 2008/0070774 A1 | 3/2008 | Shmotev et al. | |
| 2008/0087429 A1 | 4/2008 | Brannon et al. | |
| 2009/0032253 A1 | 2/2009 | Smith et al. | |
| 2009/0032254 A1 | 2/2009 | Smith et al. | |
| 2009/0137433 A1 | 5/2009 | Smith et al. | |
| 2011/0077176 A1* | 3/2011 | Smith et al. | 507/271 |

* cited by examiner

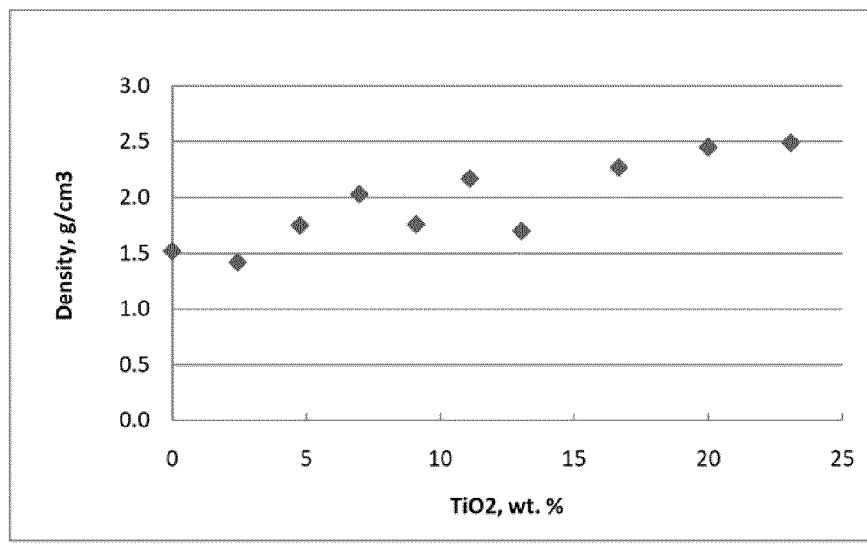
Figure 1. Density of the cenosphere powder-derived glassceramics as a function of $TiO_2$ content. All the samples were sintered at 1200°C for 4h.

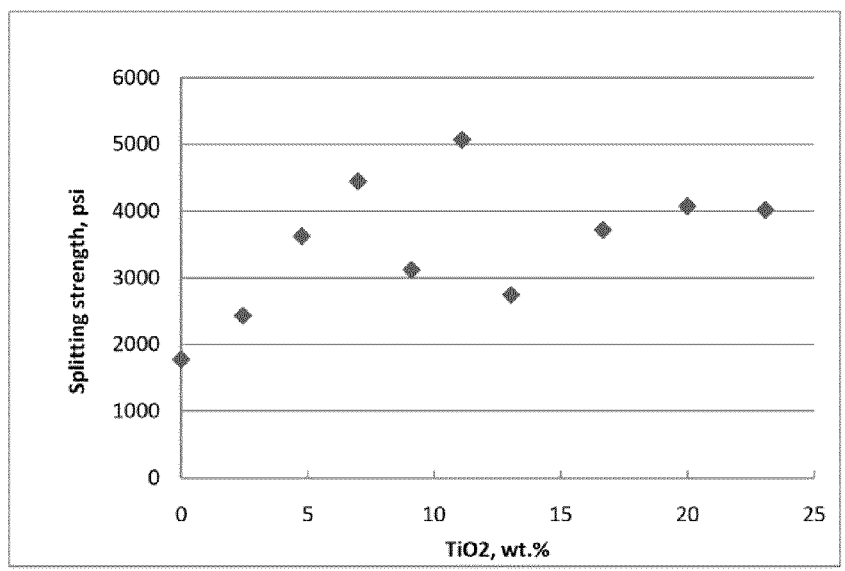
Figure 2. Diametral splitting tensile strength of the cenosphere-derived glassceramics as a function of $TiO_2$ content. All the samples were sintered at 1200°C for 4h.

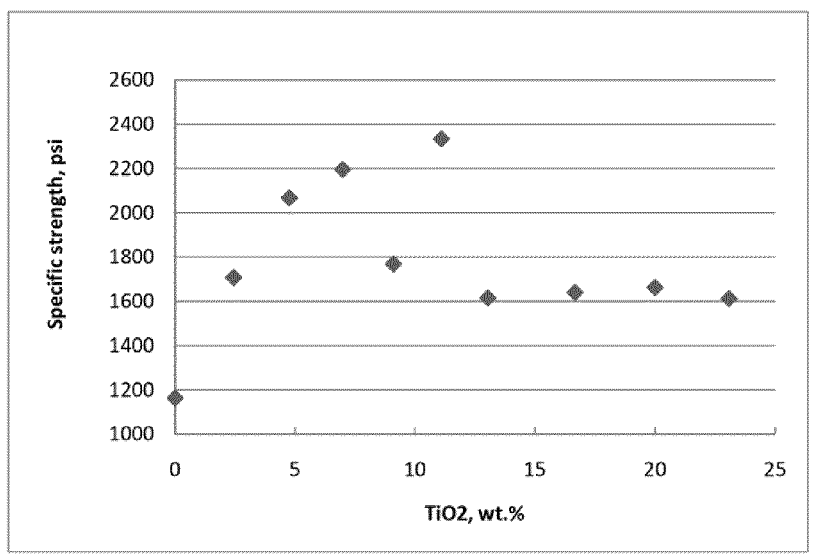
Figure 3. Specific diametral splitting tensile strength of the cenosphere-derived glass-ceramics as a function of $TiO_2$ content.

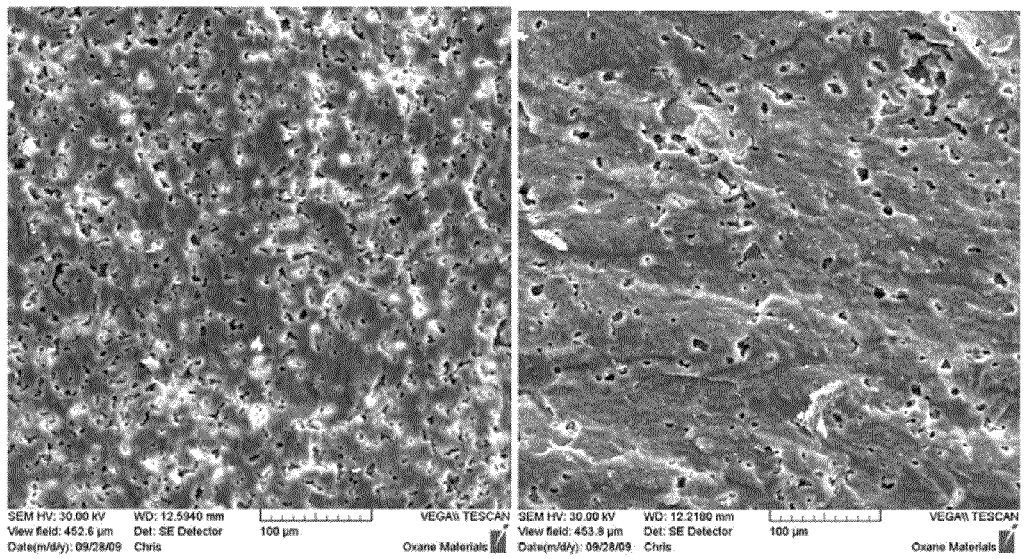
Figure 4. Fracture surface of composites made from 25% ceno ($d_{50}$ = 6 μm) and 75% cordierite without $TiO_2$ (left) and with 7% $TiO_2$ (right). The samples were sintered at 1260°C for 6 h.

US 8,178,476 B2

PROPPANT HAVING A GLASS-CERAMIC MATERIAL

This application claims the benefit under 35 U.S.C. §119 (e) of prior U.S. Provisional Patent Application No. 61/289,014, filed Dec. 22, 2009, which is incorporated in its entirety by reference herein.

The present invention relates to proppants and methods to make the proppants and uses of the proppants. In the present invention, the proppant or a portion thereof has a glass-ceramic material present. The presence of a glass-ceramic material can provide one or more benefits, such as increased stiffness (or modulus of rigidity, "MOR"), a desirable coefficient of thermal expansion, and/or other benefits.

Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates.

Ceramic proppants are widely used as propping agents to maintain permeability in oil and gas formations. High strength ceramic proppants have been used in the hydrofracture of subterranean earth in order to improve production of natural gas and/or oil. For wells that are drilled 10,000 feet or deeper into the earth, the proppant beads need to withstand 10 kpsi or higher pressure to be effective to prop the fracture generated by the hydrofracture process. Currently only proppants formed from high strength materials, such as sintered bauxite and alumina have sufficient compressive and flexural strength for use in deep wells. These conventional high strength materials are expensive, however, because of a limited supply of raw materials, a high requirement for purity, and the complex nature of the manufacturing process. In addition, such high strength materials have high specific gravity, in excess of 3.0, which is highly undesirable for proppant applications. Producing high strength proppants with low specific gravity is also a challenge. In field applications, the transportability of proppants in wells is hindered by the difference of specific gravities of proppant and carrying fluid. While light weight oxide materials, such as cordierite, have low specific gravity, they have a relatively weak flexural strength and stiffness.

SUMMARY OF THE INVENTION

A feature of the present invention is to provide a proppant having an improved coefficient of thermal expansion. Another feature of the present invention is to provide a proppant that can provide increased stiffness (modulus of rigidity).

An additional feature of the present invention is to provide a proppant having better resistance to fracturing.

A further feature of the present invention is to provide a proppant that can have less discreet interfaces between various layers that can form the proppant.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a proppant having a template sphere. The proppant optionally has a shell that can be sintered around the entire outer surface of the template sphere. The optional shell can comprise glass-ceramic. The optional shell, which can comprise one or more layers, can contain one or more metal oxides, a ceramic material or oxide thereof, and/or other suitable materials. The outer surface of the template sphere can include or have a glass-ceramic material. In addition to or in lieu of the outer surface of the template sphere having a glass-ceramic material, a glass-ceramic containing layer can be present on the outer surface of the template sphere. The present invention further relates to a method to prop open subterranean formation fractions using one or more proppants of the present invention, which can be contained in proppant formulations.

The present invention further relates to methods of making the various proppants of the present invention. For instance, one method includes crystallizing at least an outer surface of a template material to form glass-ceramic, and coating the template material with a formulation comprising a ceramic material or oxide thereof and/or one or more metal oxides and/or other material to form a shell around the template and then hardening the shell, such as by sintering or calcining. Other methods are further described.

It is to be understood that both the foregoing general description and the following detailed description are exemplary and explanatory only and are intended to provide a further explanation of the present invention, as claimed.

BRIEF DESCRIPTION OF THE DRAWINGS

FIG. 1 is a graph showing the density of the cenosphere powder-derived glass-ceramics of the present invention as a function of $TiO_2$ content. All the samples were sintered at 1200° C. for 4 h.

FIG. 2 is a graph showing the diametral splitting tensile strength of the cenosphere-derived glass-ceramics of the present invention as a function of $TiO_2$ content. All the samples were sintered at 1200° C. for 4 h.

FIG. 3 is a graph showing the specific diametral splitting tensile strength of the cenosphere-derived glass-ceramics of the present invention as a function of $TiO_2$ content.

FIG. 4 are two SEMs showing the fracture surface of composites made from 25% ceno ($d_{50}$=6 μm) and 75% cordierite without $TiO_2$ (left) and with 7% $TiO_2$ (right). The samples were sintered at 1260° C. for 6 h.

DETAILED DESCRIPTION OF THE PRESENT INVENTION

The present invention relates to a proppant, methods of making the proppant, and uses for the proppant, including using the proppant for assisting in hydrocarbon recovery.

The present invention relates to a proppant having present a glass-ceramic or a glass-ceramic material as part of the proppant. When the proppant comprises one or more components, one or more of the components can contain the glass-ceramic. For instance, the proppant can be a template sphere or core, and at least the outer surface of the template sphere or core can be or can comprise or consist essentially of or consist of one or more glass-ceramics.

As an option, the proppant can be a template sphere having one or more layers located on the sphere. At least one of these layers can comprise, consist essentially of, or consist of one or more glass-ceramics. For instance, a proppant can be a template sphere (which can optionally contain a glass-ceramic) that has a glass-ceramic containing layer in contact (direct contact or in contact with a layer located on said template sphere) with at least the outer surface of the template sphere. As an option, the proppant can be a template sphere having an outer surface wherein the outer surface of the template sphere comprises a glass-ceramic(s) and further has at least one layer in contact (direct contact or in contact with a layer located on said template sphere) with the outer surface of the template sphere, wherein the layer(s) comprises a glass-ceramic(s). The glass-ceramic containing layer can at least partially diffuse into the outer surface of the template sphere.

The template sphere (which also can be referred to as a core or substrate) can be a solid sphere or a hollow sphere, or a sphere having one or more voids or a sphere having porosity. It should be understood that a solid sphere, as used herein, does not contain a void space in the center, although a porous material would be suitable. A fully dense material is not a requirement of a solid sphere. It should be understood that a hollow sphere, as used herein, has at least one void space inside with a defined size and shape. The template sphere can have a void volume % of at least 30%. The template sphere can be formed from a glass or substantially glassy material. For the template sphere, it is preferable to use a cenosphere or similar glass-like hollow sphere. The cenosphere can be a commercially produced ceramic or glass hollow sphere that is made as a side product in various industrial processes. For purposes of the present invention, while the term "sphere" is used, it is to be understood that the "sphere" can have irregular shapes (e.g., non-spheroidal) and, therefore, can be a consistently round spherical object or it can be less than perfect with respect to sphericity and/or roundness or can have other shapes. As an option, the template sphere can have a Krumbein sphericity of at least about 0.3, such as at least 0.4, at least 0.5, at least 0.6, at least 0.7, such as from 0.3 to 0.9 or higher. As an option, the template sphere alternatively, or in addition, can have a roundness of at least about 0.1, such as at least about 0.3, at least 0.4, at least 0.5, at least 0.7, such as from 0.1 to 0.9 or higher. The overall proppant, which can be the template sphere, alone or with one or more layers on the template, can have the same Krumbein sphericity and/or roundness values mentioned for the template. The proppant can have a Krumbein sphericity of at least about 0.5 (such as at least 0.6, at least 0.7, at least 0.8, at least 0.9, such as from 0.5 to 0.9 or higher) and/or the proppant can have a roundness of at least about 0.4 (such as at least 0.5, at least 0.7, at least 0.8, such as from 0.4 to 0.9 or higher).

As stated, as one option, the proppant can have one or more layers located on the template sphere. At least one of these layers can form a shell around the entire outer surface of the template sphere. The shell can be a continuous shell or a non-continuous shell. The shell can have a thickness of from about 5 micrometers to 150 micrometers or thicker. The shell can be sintered. The shell can include ceramic. The shell can include glass-ceramic.

With respect to the glass-ceramic that is present in the proppant, as stated, the glass-ceramic or glass-ceramics can be present in one or more components (or parts) of the proppant. The glass-ceramic can be present on at least the outer surface of the template sphere. With this option, the glass-ceramic can be present on the entire circumference of the outer surface of the template sphere or a portion thereof. The outer surface can comprise the exposed, outer most surface. The presence of the glass-ceramic can include portions beneath this exposed surface, such as 0.1% to 100% of the inner volume or area of the template sphere, e.g., from 1% to 90%, from 5% to 80%, 10% to 70%, 15% to 60%, 20% to 50%, and the like. Other materials can be present along with the glass-ceramic. The glass-ceramic can be distributed uniformly or non-uniformly in the outer surface and/or inner volume of the template sphere. The glass-ceramic of the template sphere can be in solid form. The glass-ceramic of the template sphere can be in porous or hollow form.

The glass-ceramic can be present uniformly throughout the shell or distributed non-uniformly in one or more portions of the shell. The glass-ceramic of the shell can be in solid form. The glass-ceramic of the shell can be in porous or hollow form.

The glass-ceramic of the shell can be the same or different from the glass-ceramic of the template sphere. For example, the glass-ceramic of the shell can have the same or different degree of crystallinity as the glass-ceramic of the template sphere, and/or the same or different composition as the glass-ceramic of the template sphere.

In the present invention, the glass-ceramic can comprise from about 0.5% by weight to about 100% by weight of the overall proppant, based on the total weight percent of the proppant. For instance, the glass-ceramic can be present in an amount from about 5 wt % to about 90 wt % or higher, from about 10 wt % to about 75 wt %, from about 15 wt % to about 50 wt %, from about 20 wt % to about 30 wt % or higher, all based on the total weight of the proppant.

Glass-ceramic, as used herein, refers to any glass-ceramic that is formed when glass or a substantially glassy material is annealed at elevated temperature to produce a substantially crystalline material with limited crystallinity or controlled crystallite size. As used herein, limited crystallinity should be understood as crystallinity of from about 5% to about 100%, by volume (e.g., 10% to 90%; 20% to 80%; 30% to 70%; 40% to 60% by volume). The crystallite size can be from about 0.01 micrometers to 20 micrometers, such as 0.1 to 5 micrometers. Preferably the crystallite size is less than 1 micrometer. The glass-ceramic can be composed of aluminum oxide, silicon oxide, boron oxide, potassium oxide, zirconium oxide, magnesium oxide, calcium oxide, lithium oxide, phosphorous oxide, and/or titanium oxide or any combination thereof.

The glass-ceramic can comprise from about 35% to about 55% by weight $SiO_2$; from about 18% to about 28% by weight $Al_2O_3$; from about 1% to about 15% by weight (e.g., 1 to 5 wt %) CaO; from about 7% to about 14% by weight MgO; from about 0.5% to about 15% by weight $TiO_2$ (e.g., 0.5 to 5 wt %); from about 0.4% to about 3% by weight $B_2O_3$, and/or greater than 0% by weight and up to about 1% by weight $P_2O_5$, all based on the total weight of the glass-ceramic. The glass-ceramic can comprise from about 3% to about 5% by weight $Li_2O$; from about 0% to about 15% by weight $Al_2O_3$; from about 10% to about 45% by weight $SiO_2$; from about 20% to about 50% by weight MgO; from about 0.5% to about 5% by weight $TiO_2$; from about 15% to about 30% by weight $B_2O_3$, and/or from about 6% to about 20% by weight ZnO, all based on the total weight of the glass-ceramic.

The template sphere can comprise a mixture of aluminum oxide, silicon oxide, titanium oxide, iron oxide, magnesium oxide, calcium oxide, potassium oxide and/or sodium oxide, and/or any combination thereof.

The glass-ceramic can be fully or nearly fully crystalline or can contain a glass component (e.g., phase(s)) and a crystalline component (e.g., phase(s)) comprising crystallites. The glass-ceramic can have a degree of crystallinity of from about 5% to about 100%, or from about 15% to about 80%. For example, the glass-ceramic can have from about 50% to 80% crystallinity, from about 60% to 78% crystallinity or from about 70% to 75% crystallinity by volume. The crystallites can have a random and/or directed orientation. With respect to the orientation of the crystals that are present in the glass-ceramic, the crystal orientation of the crystals in the glass-ceramic can be primarily random or can be primarily directed in a particular orientation(s) (e.g., non-random). For instance, the crystal orientation of the glass-ceramic can be primarily random such that at least 50% or higher of the orientations are random orientations based on the overall orientation of the crystals present. For instance, the random orientation can be at least 60%, at least 70%, at least 80%, at least 90%, such as from about 51% to 99%, from 60% to 90%, from 70% to 95% or higher with respect to the percent of the crystals that are random based on the crystals measured. X-ray diffraction ("XRD") can be used to determine the randomness of the crystallites. As the glass-ceramic can have both crystal and glass components, the glass-ceramic can have certain properties that are the same as glass and/or crystalline ceramics. Thus, the glass-ceramic can provide an ideal gradient interface between the template sphere and the ceramic shell, if present. The glass-ceramic can be impervious to thermal shock. Furthermore, the proportion of the glass and crystalline component of the glass-ceramic can be adjusted to match (e.g., within 10%, within 5%, within 1%, within 0.5%, within 0.1%) the coefficient of thermal expansion (CTE) of the shell or other material to which it will be bonded or attached or otherwise in contact with, in order to prevent premature fracture(s) resulting from cyclic stresses due to temperature changes, or thermal fatigue. For example, when the glass-ceramic has from 70% to 78% crystallinity, the two coefficients balance such that the glass-ceramic as a whole has a thermal expansion coefficient mismatch that is very close to zero.

The present invention can provide a proppant with improved stiffness and/or lower density. Unlike some proppants that are composites having a sharp interface between two dissimilar components (e.g., layer interface), or composites having a distinct linear interface, the proppant of the present invention can be either a monolithic structure or a composite having a gradient interface between composite components, or a gradient in composite properties. As such, the proppant of the present invention has little or none of the stress associated with proppants having a distinct linear interface between dissimilar materials. The stress, or internal locked stress, of the proppant can be measured by any suitable technique known in the art. The stress of the proppant can be determined by X-ray diffraction peak profile analysis, for example. As is generally known in the art, with X-ray diffraction, stress in a material can be indicated by broadening of diffraction peaks. Techniques to measure broadening of diffraction peaks are known in the art. The proppant of the present invention is therefore, less prone to fracture than conventional proppants.

The proppant can be a multi-phase system or a single-phase system. In a multi-phase system, such as a two phase system, the proppant can comprise a template sphere or core and a second phase(s) that can be different or dissimilar from the template sphere or core. The second phase of the two-phase system can coat or encapsulate or act as a shell to the supporting or template first phase, and/or infiltrate (e.g., partially to optional varying degrees or gradients or completely) the supporting or template first phase, and/or react with the supporting or template first phase. The template sphere can include, at least partially, glass or a glass-containing ceramic material. The second phase can be a ceramic or glass-ceramic shell. The present inventors have found that a sharp interface between the shell and the template sphere of the proppant should be avoided in order to achieve a proppant with improved properties. For example, a sharp interface between a glassy template sphere and a ceramic shell can be avoided by crystallizing at least the outer surface of the template sphere, to form glass-ceramic, by providing a glass-ceramic layer between this interface, and/or by providing a shell that is at least partially glass-ceramic. By providing glass-ceramic at least between the template sphere and the shell, a sharp interface between two different materials can be avoided. In the proppant of the present invention, the glass-ceramic can serve as a functionally gradient material. In other words, the glass-ceramic can permit a gradual transition of ratios between glass content and ceramic content, and thereby, a gradient in composite properties. Furthermore, glass-ceramics can have improved properties compared to glass. For example, by incorporating glass-ceramic in the template sphere, the proppant can achieve increased stiffness, improved fracture toughness, low thermal expansion coefficient, high hardness, high Young's Modulus, thermal stability, and/or high strength.

With the present invention, various proppant sizes are possible. Sizes (e.g., particle diameters) may vary from 10 micrometers to 10,000 micrometers. The particle diameter can be in the range of from 50 micrometers to 2,000 micrometers or 100 micrometers to 2000 micrometers. The sizes of the template spheres (e.g., particle diameters) can also vary. The template sphere can, for example, have a diameter that is from about 20 micrometers to about 1000 micrometers, such 100 micrometers to 1000 micrometers.

The glass-ceramic in the proppant can be a mechanically strong material and can sustain temperatures of up to about 800° C. to 1500° C. The glass-ceramic can withstand temperature changes of 100° C. in a span of one minute or less (e.g., 60 seconds to 1 second, 10 seconds to 50 seconds). The glass-ceramic can have a density of from about 1.0 to about 3.5 g/cm$^3$, such as 1.5, 2.0, 2.52, or 2.5 g/cm$^3$. The glass-ceramic can have a Young's Modulus of from about 50 to about 80 GPa, such as 68, 66.9, or 70 GPa. The glass-ceramic can have a shear modulus (at 25° C.) of from about 20 to about 50 GPa, such as 25 GPa or 25.5 GPa. The glass-ceramic can have a modulus of rupture (at 25° C.) of from about 50 to about 150 MPa, such as 60 MPa, 70 MPa, 80 MPa, or 100 MPa. The glass-ceramic can have a compressive strength of from about 300 MPa to about 500 MPa, such as 360 MPa. The glass-ceramic can have a fracture toughness of from about 1 to about 10 MPa·m$^{1/2}$, such as 1.52, 1.53, or 1.54 MPa·m$^{1/2}$. The glass-ceramic can have a thermal conductivity of 1.45 to about 1.53 W/(m·K) or higher, such as 1.47 W/(m·K).

The proppant can have properties similar to those described for the glass-ceramic. For example, the proppant can have at least one of the following properties: a density of from about 1.5 to about 3.0 g/cm$^3$; a Young's Modulus of from about 50 to about 80 GPa; a MOR (at 25° C.) of from about 50 to about 150 MPa, such as 90 to 110 MPa, or 93 to 97 MPa; a shear modulus (at 25° C.) of from about 20 to about 50 GPa; a compressive strength of from about 300 MPa to about 500 MPa; and/or a fracture toughness of about 1 to about 10 MPa·m$^{1/2}$, such as 1.54 to about 1.55 MPa·m$^{1/2}$. The proppant can have a specific gravity of from about 1.0 to about 4.0. For example, the proppant can have a specific gravity of about 3 or less (e.g., 0.5 to 3, 0.8 to 2.5, 0.9 to 2.3, 1 to 2, 1.1 to 1.8, 1.2 to 1.7, from 0.8 to 2, and the like). The proppant can have a coefficient of thermal expansion (CTE at from 25° C. to 300° C.) of from 0.1×10$^{-6}$/K to 13×10$^{-6}$/K (e.g., 0.1×10$^{-6}$/K to 12×10$^{-6}$/K, 0.3×10$^{-6}$/K to 5×10$^{-6}$/K, 0.5×10$^{-6}$/K to 1.0× 10$^{-6}$/K, 0.75×10$^{-6}$/K to 1.5×10$^{-6}$/K). The proppant can have a thermal conductivity of from about 0.01 W/(m−K) to 3.0 W/(m−K) (e.g. 1.45 W/(m−K) to about 1.47 W/(m−K)).

The proppants of the present invention can have a crush strength of 1,000 psi to 20,000 psi or higher (e.g., from 1,500 psi to 10,000 psi, from 3,000 psi to 10,000 psi, from 5,000 psi to 10,000 psi, from 9,000 psi to 12,000 psi). Other crush strengths below or above these ranges are possible.

The template sphere can have a coefficient of thermal expansion (CTE at from 25° C. to 300° C.) of from about $0.1 \times 10^{-6}$/K to about $13 \times 10^{-6}$/K, such as from $0.1 \times 10^{-6}$/K to $2 \times 10^{-6}$/K or $1.2 \times 10^{-6}$/K to $1.7 \times 10^{-6}$/K. The template sphere can have a specific gravity of from 0.01 to about 3. The template sphere can have a MOR of from about 1 to about 100 MPa, such as 10 to 90 MPa.

The amount of glass-ceramic present in the template sphere can be about 0.1% to 100% by weight of the template sphere. For example, the amount of glass-ceramic present in the template sphere can be from about 1% to about 90%, from about 10% to 80%, from about 20% to 70%, from about 30% to 60%, from about 40% to 50%, from about 5% to 75%, from about 50% to 70%, from about 65% to 85%, from about 15% to 65%, or from about 90% to 99% by weight of the template sphere, wherein all percents are percent by weight based on the weight of the template sphere. If the glass-ceramic content is less than 100% by weight of the template sphere, the remaining portion of the template sphere can be made from glass or a mixture of glass and crystalline ceramic materials, and/or other materials, e.g., metal, metal oxides, and the like. The template sphere may also include crystal initiators. Crystal initiators can include, but are not limited to, alkali metals (or oxides thereof), such as, lithium, sodium, potassium, rubidium, cesium, and francium, as well as transition metals or oxides of transition metals, such as, scandium titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, unnunilium, unununium, ununbium, or any combinations thereof. The amount of crystal initiators present in the template sphere can be from about 0.1%-25% by weight, such as 0.1%-7%, 0.1%-5%, or 0.1%-3% by weight.

Glass, as used herein, can be any inorganic, non-metallic solid non-crystalline material, such as prepared by the action of heat and subsequent cooling. The glass can be any conventional glass such as, for example, soda-lime glass, lead glass, or borosilicate glass. Crystalline ceramic materials, as used herein, can be any inorganic, non-metallic solid crystalline material prepared by the action of heat and subsequent cooling. For example, the crystalline ceramic materials can include, but are not limited to, alumina, zirconia, stabilized zirconia, mullite, zirconia toughened alumina, spinel, aluminosilicates (e.g., mullite, cordierite), perovskite, perchlorate, silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or any combination thereof.

The template sphere can have at least an outer surface that is glass-ceramic. For example, at least 1% to 100% (e.g., 10% to 90%, 20% to 70%, 0.5% to 5%, 1% to 5%, 2% to 10%, 1% to 20%, 5% to 30%, 5% to 40%, 10% to 50%) of the radius starting from the outer surface of the template sphere going to the center of the sphere, can be glass-ceramic. The template sphere can include aluminum oxide, silicon oxide, iron oxide, magnesium oxide, calcium oxide, potassium oxide, etc., or mixtures thereof. The glass-ceramic of the template sphere can have a thickness of any amount, such as from 1 micron to about 150 micrometers or from about 5 micrometers to about 120 micrometers. The glass-ceramic can be formed to have a substantially uniform thickness around the template sphere. For instance, the thickness of the glass-ceramic can be substantially uniform in thickness by not varying in thickness by more than 20% or more preferably by not varying more than 10% in overall thickness. The glass-ceramic can be non-continuous or continuous. Continuous, for purposes of the present invention means that the entire outer surface of the template sphere is glass-ceramic. Preferably, at least the entire outer surface of the template sphere is glass-ceramic. The outer surface can have a thickness of from about 0.1 to about 1000 μm.

It should be understood that the degree of crystallinity in the glass-ceramic can vary from one portion of the template sphere to another portion of the template sphere. For example, the glass-ceramic forming the outer surface of the template sphere, or the portion of the template sphere nearest to the shell, can have a greater crystallinity than glass-ceramic which is formed deeper (depth in the sphere) within the template sphere and further from the shell. The crystallinity of the glass-ceramic beginning at the outer surface of the template sphere can be from about 10% to 100%, for example, and then progressively decrease as the glass-ceramic approaches the non-crystalline glass portion of the template sphere, ending at a crystallinity of from about 1% to 100%.

The template sphere can be entirely glass-ceramic. The template sphere can be a cenosphere formed from both glass and ceramic, and have an outer surface that is glass ceramic.

In a two-phase system, the second phase as a layer or layers can coat the supporting or template first phase, and/or infiltrates the supporting or template first phase, and/or reacts with the supporting or template first phase. The second phase or shell can be partially ceramic, partially glass-ceramic, entirely ceramic, or entirely glass-ceramic. The shell can be crystalline or amorphous. For example, the shell can include an oxide, such as aluminum oxide called alumina. The shell can include a silicon oxide, sodium oxide, potassium oxide, calcium oxide, zirconium oxide, aluminum oxide, lithium oxide, iron oxide, magnesium oxide, calcium oxide, cerium oxide, yttrium oxide, scandium oxide, titanium dioxide, cordierite, spinel, spodumene, steatite, a silicate, a substituted aluminosilicate clay or any combination thereof. The shell can include a metal oxide, a metal carbide, a metal nitride, a metal boride, a metal silicide or any combination thereof, derived from any metal sources and any combination thereof.

The shell can include a mixed metal oxide of aluminum called an aluminate, a silicate, or an aluminosilicate, such as mullite or cordierite. The shell can include an amorphous silica. The aluminate or ceramic may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like. The shell may further include crystal initiators, such as $TiO_2$ or $Li_2O$. The amount of crystal initiators present in the shell can be from about 0.1% to 25%, such as 1% to 15%, 3% to 13 wt %, 0.1% to 7%, 0.1% to 5%, or 0.1% to 3% by weight, based on the weight of the shell.

The shell can comprise one or more layers (e.g., two, three, four, five, or more layers). Each of the shell layers can vary in composition from an adjacent shell layer. For example, the amount of one or more components in each shell layer (if one or more are the same) can gradually increase or decrease from layer to layer. Additionally or alternatively, one or more components of one shell layer can be different from another shell layer.

The shell can have a coefficient of thermal expansion (CTE at from 25° C. to 300° C.) of from $0.1 \times 10^{-6}$/K to $13 \times 10^{-6}$/K, such as from $0.1 \times 10^{-6}$/K to $12 \times 10^{-6}$/K or $1.2 \times 10^{-6}$/K to $5 \times 10^{-6}$/K.

The proppants of the present invention can comprise a single particle or multiple particles and can be a solid, partially hollow, partially hollow and randomly distributed or completely hollow in the interior of the particle. The particle can be spherical, nearly spherical, polygonal, oblong in shape (or any combination thereof) or have other shapes suitable for purposes of being a proppant. The proppant can also be in the shape of, for example, rods, pillars, spikes, gears, donuts, cylinders, or peanuts. The desired proppant shape can be achieved in any suitable manner. The desired proppant shape can be achieved using, for example, extrusion, granulation, fluid bed coating, a fluid bed granulator, a fluid spray dryer, or a pelletizer, such as an Eirich mixer. The particles can have any aspect ratio (L/D), such as from 2:1 to 1:2 (e.g., 1.2:1 to 1:1.12, such as 1:1 or about 1:1).

The overall proppant can have any particle size. For instance, the proppant can have a particle diameter size of from about 90 micron to about 2 mm, or a diameter of from about 90 micrometers to about 20,000 micrometers, or a diameter of from about 100 micrometers to about 2,000 micrometers, or a diameter of from about 200 micrometers to about 1000 micrometers. Other particle sizes can be used. Further, the particle sizes as measured by their diameter can be above the numerical ranges provided herein or below the numerical ranges provided herein.

In a single-phase system, the proppant can comprise a sphere, but does not include a second phase as a shell that is different or dissimilar from the template sphere or core. The sphere in the single-phase system can have the same composition and dimensions, as the template sphere of the multi-phase system, described above. Like the template sphere of the multi-phase system, the sphere of the single-phase system can have at least an outer surface that is glass-ceramic. The sphere of the single-phase system can be entirely glass-ceramic. The sphere of the single-phase system can, for example, have a composition of from about 44% to 48% $SiO_2$, 14% to 18% $Al_2O_3$, 5% to 10% $B_2O_3$, 8% to 12% $K_2O$, and 13% to 18% MgO, all weight percents that are based on the total weight of the sphere. For instance, the sphere of the single-phase system can have 46 wt % $SiO_2$, 16 wt % $Al_2O_3$, 7 wt % $B_2O_3$, 10 wt % $K_2O$, and 17 wt % MgO, based on the weight of the sphere.

The proppants of the present invention can be used to prop open subterranean formation fractions. The proppant can be suspended in a liquid phase or other medium to facilitate transporting the proppant down the well to a subterranean formation and placed such as to allow the flow of hydrocarbons out of the formation. The medium chosen for pumping the proppant can be any desired medium capable of transporting the proppant to its desired location including, but not limited to, a gas and/or liquid, energized fluid, foam, like aqueous solutions, such as water, brine solutions, and/or synthetic solutions. Any of the proppants of the present invention can have a crush strength sufficient for serving as a proppant to prop open subterranean formation fractures. For instance, the crush strength can be 1,000 psi or greater, 3,000 psi or greater, greater than 4,000 psi, greater than 9,000 psi, or greater than 12,000 psi. Suitable crush strength ranges can be from about 3,000 psi to about 20,000 psi, or from about 5,000 psi to about 20,000 psi, and the like. In some applications, like coal bed methane recovery, a crush strength below 3,000 psi can be useful, such as 500 psi to 3,000 psi, or 1,500 psi to 2,000 psi.

The proppant can be suspended in a suitable gas, foam, energized fluid, or liquid phase. The carrier material, such as a liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. The present invention also relates to a well site or subterranean formation containing one or more proppants of the present invention.

The preparation of the glass-ceramic can involve heat treating a glass article at a temperature where crystal nuclei are allowed to form in the glass and treating the glass article at a temperature where the crystallites of the desired phases are allowed to grow to a desired extent. In the present invention, the crystalline grains of the glass-ceramic can be annealed from a glass or substantially glass sphere or template sphere. Annealing induces nucleation of one or more crystalline phases. Nucleation may be accelerated by seeding the glass with crystal initiators, such as titanium dioxide and/or lithium oxide. Annealing is completed when the intended level of crystallinity is reached, typically from 1% to 100%, from 15% to 80%, from 50% to 80%, from 60% to 78% and from 70% to 75%, in weight percents by weight of the article (e.g., template sphere or layer).

As described above, the template sphere can be formed from a glass or substantially glassy material. The template sphere can be a glass or glass-like hollow sphere. The glass sphere can be either partially or entirely converted to glass-ceramic upon heating of the glass sphere or upon sintering of the shell. By regulating the temperature, crystal growth can occur, which is generally random in nature. Temperature can be regulated by introducing a temperature gradient and degree of cooling or first heating, then cooling and followed by a heating to promote glass-ceramic formation or conversion. It is also possible to achieve an oriented crystal alignment, however, which may further enhance stiffness. During annealing, crystalline grains nucleate, begin to grow, and ultimately comprise a majority of the material. High melting point compounds or crystal initiators, such as titanium dioxide or alkali metals or oxides thereof or other materials listed elsewhere herein, can facilitate nucleation and/or act as a catalyst. The nucleation temperature is a temperature at which crystals begin to form and grow within the glass. The selected nucleation temperature should be below a temperature at which the glass would thermally deform. Below its melting temperature, a crystal typically has significantly lower thermal deformation than a corresponding glass.

The crystal initiators can be in the form of a solid powder. The particle size of the powder can be modified by milling. The crystal initiators can, alternatively, be in liquid form. The crystal initiators can be derived from precursors that convert to oxide from either liquid, solid or gaseous forms. For example, the precursors can include, $TiCl_4$, LiCl, $Ti(OC_2H_5)_4$, or Li(OH). The oxides convert partially or entirely, to glass-ceramic.

As stated previously, the shell can be formed from a silica, an alumina, and/or other ceramics, such as cordierite and mullite. The silica can be, for example, an amorphous silica. Crystal initiators may be used to facilitate converting the amorphous silica or alumina to oxides.

The shell can be applied to the template sphere before or after the template sphere has achieved the desired crystallinity. In other words, the shell can be formed on the template sphere once the template sphere is comprised at least partially of glass-ceramic. Alternatively, the shell coating can be applied to the surface of a glass template sphere prior to crystallization of the template sphere. The template sphere can be coated with the shell coating and sintered. Upon heat treatment of the composite shell and template sphere, any glass material in the shell as well as glass in the template sphere can be partially, or entirely converted to a glass-ceramic.

The shell can be formed from ceramics, such as cordierite and/or mullite, and/or with crystal initiators, such as $TiO_2$ or $Li_2O$. The crystal initiators can be added to a coating slurry as a solid powder, or as liquid, solid, or gaseous precursors which convert to oxides. If a solid powder is used, the size of the powder particles can be controlled by milling. The precursors can be, for example, $TiCl_4$, $LiCl_2$, $Ti(OC_2H_5)_4$, and/or $Li(OH)$. The template sphere can be coated with the ceramic shell coating and sintered. The sintered ceramic grain size can be less than 1 micron, such as 0.1 to 0.8 micrometers, or 0.2 to 0.5 micrometers.

The shell can be formed from amorphous silica and/or alumina. The amorphous silica and/or alumina are glass-ceramic precursors which, with the addition of crystal initiators, can be converted to oxides. The oxides, once obtained, can convert, entirely, or at least partially to glass-ceramic.

The shell can be formed from glass-ceramic precursors and other ceramics, such as cordierite or mullite. The composite of the glass-ceramic precursors and ceramic materials in the shell can be heat treated with the template sphere. Upon heating, the glass materials in the template sphere and shell can be converted entirely, or at least partially to glass-ceramic.

The shell can be prepared from one or more different coating slurries to form one or more shell layers on the template sphere. At least one coating slurry can include ceramic materials, such as cordierite or mullite. Crystal initiators can be added into the coating slurry. If a plurality of shell layers is desired, a spray coater may be programmed to alternately spray from at least two different coating slurries onto the template. After coating the template sphere with at least two different coating slurries, the proppant can be heated to achieve a layered shell structure. During heating, the top shell layer is exposed to more heat than the underlying shell layers and the template sphere. As such, small-glass ceramic particles which can form in the top shell layer can fuse together and result in a dense top layer.

The substrate or template, preferably prior to the optional second phase or optional coating or optional shell being present, can be treated in one or more ways to remove or diminish flaws on the surface of the substrate or template. These flaws may be convex or concave in nature or both. This can be especially beneficial when the template or substrate is an inorganic material. The removal or diminishing of these flaws, especially strength-limiting flaws, can permit the second phase or coating or shell to provide more enhanced strengthening of the substrate or template and the overall proppant. The flaws can include, but are not limited to, peaks, protuberances, ridges, craters, and other flaws which can include surface undulations, which are significantly different from the overall surface texture or surface smoothness of the substrate or template. A flaw in a material system can be considered as anything which negatively impacts the apparent strength of a material system. Flaws can be physical and/or chemical in nature. Physical flaws may include such things as protuberances, bumps, scratches, grooves, pores, pits, dislocations, and/or defects in the crystal structure of the material. Chemical flaws may include phases that prevent solid state bonding, e.g. grain boundary phases, modification of the crystal structure through atomic substitution, and the like. By removing or diminishing these flaws in the surface of the substrate or template, the sharp protuberances or peaks or ridges can be removed or diminished, and a surface can be created that is "smoother and more spherical" which can permit the second phase or coating or shell to be more effective in providing strength to the overall proppant. There are one or more ways to quantitatively show the removal or diminishing of flaws on the surface of the substrate or template. For instance, an aspect ratio (AR) test can be used and/or the radius of curvature (RC) can be compared.

For purposes of the present invention, the AR can be 5 or less, such as from 0.1 to 5, or from 0.2 to 5, or from 0.5 to 5, or from 0.1 to 4, or from 0.1 to 3, or from 0.1 to 2, or from 0.8 to 1, or from 0.1 to 1.8, or from 0.1 to 1.5, or from 0.5 to 1.3, or from 0.7 to 1.2 and other ranges. Preferably, the AR is about 1.

The RC can typically range from 0.5 µm to 100 µm, with the upper limit of the radius of curvature being the radius of the template.

With respect to the heat treatment for crystallizing glass to form the glass-ceramic, various devices and methods can be used which provide sufficient temperature to allow crystallization to occur. These devices and/or methods include, but are not limited to, static bed furnaces, dynamic bed furnaces (e.g., rotating tube furnaces), fluidized bed furnaces, direct injection into high temperature flames (for instance, oxidizing flames), use of a gas flame contained within a combustion tube mounted vertically and/or injection into a high temperature plasma flame. The template sphere can be heated to any temperature sufficient to crystallize all or a portion of the template sphere, for instance, to temperatures of from about 300° C. to 1,300° C. or 500° C. to 1,500° C. The heat treatment can occur for any time sufficient to crystallize all or a portion of the template sphere. The heat treatment can occur for a period of, for example, 10 minutes to 50 hours or more, such as 2 hours to 10 hours. During the heat treatment, pressures can be used to control the template structure or the physical properties of the template. For instance, pressures may be used from less than 0.1 atm to 10 atm or greater, such as from 1 atm to 5 atm. When the localized pressure is reduced to values below that of ambient pressure, this can lead to the expansion of the template and consequently a reduction in the density of the template. When the localized pressure is increased above ambient pressure, this can result in the contraction of the template to smaller overall diameters and hence an increase in the density of the template. Thus, this technique provides the ability to "dial in" or control certain densities of the proppant material. Also, the reduction or increase in pressure can improve the morphology of the template, especially when the template is held or is very near the glass transition temperature of the template material. The change in localized pressure can be achieved through the use of various pressure control devices and techniques, such as a sealed ceramic tube surrounded by heating elements and containing the template material, wherein the ceramic tube is connected to either a pressure source or sink. Pressurizing fluid can be used to achieve the desired localized pressure, such as air, nitrogen, inert gases, such as argon, or any gas. Prior to heat treatment, it is an option to include crystal initiators, as described elsewhere herein, in order to facilitate crystallization of the glass.

Heat treatment may also be carried out in alternate atmospheres, other than that of air to induce the formation of new phases, for example thermal treatment in a nitriding atmosphere to form the nitrides, or thermal treatment in a carburizing atmosphere to form the carbides. Examples of such atmospheres include inert gases, carbon monoxide, nitrogen, nitrogen oxide, nitrogen dioxide, dinitrogen pentoxide, anhydrous ammonia, and the like.

The properties of the template or substrate may be modified by way of pressure and/or temperature effects. A variation in pressure with the application of thermal energy may be used to alter the specific gravity of the template material.

The template and/or the shell (or one or more layers comprising the shell) can be surface modified, such as with the addition of silicon oxide, sodium oxide, potassium oxide, calcium oxide, zirconium oxide, aluminum oxide, lithium oxide, iron oxide, cordierite, spinel, spodumene, steatite, a silicate, an alumino silicate material, an aluminum containing material, a silicon containing material, an aluminum-silicon containing material, a substituted alumino silicate clay or any combination thereof.

The shell can be surface modified, for instance, by the addition of one or more inorganic materials or phases, or the attachment (e.g., chemical attachment or bonding) of one or more chemical groups, such as hydrophilic groups or hydrophobic groups. The chemical groups can be surfactants, polymers, ionic groups, ionizable groups, acid groups, salts, surface active agents, and the like. The surface modification can improve the surface morphology of the proppant, especially after the proppant is a sintered proppant. The inorganic material or phases used for surface modification can include glassy materials, such as silicon oxide, alone or with the addition of oxides of sodium, potassium, calcium, zirconium, aluminum, lithium, iron, or any combination thereof. The amount of the silicon oxide can be from about 70 wt % to about 99 wt %, such as from about 85 wt % to about 95 wt %, and the addition of the one or more other oxides, such as sodium oxide and the like, can be from about 1 wt % to about 15 wt %, such as from about 2 wt % to about 10 wt %. The surface modification of the shell can include the application of one or more organic materials (e.g., aliphatic compounds, ionic compounds, surfactants, aromatic compounds, polymeric compounds) or the application of an organic phase(s). The organic material or chemical groups can be bonded to the shell surface or adsorbed, or absorbed or otherwise attached. The organic material or organic phase can modify the proppant's propensity to interact with aqueous solutions, thus making the proppant either hydrophobic, hydrophilic, or hydro-neutral. The surface modification of the shell can include the use of substances that are effectively activated by temperature elevation of the proppant to yield a modification of the proppant transport fluid (e.g., breaking the gel used to transport the proppant through the subterranean regions). The surface treating, which can occur after sintering of the proppant, can have the ability to improve one or more chemical and/or mechanical properties, such as enhanced transportability.

The template or substrate and/or shell can be modified, such as surface modified, through a variety of techniques. For instance, the surface of the template or substrate can be modified through one or more heat treatments prior to the formation of the shell on the template. Another form of surface treatment can be to modify chemically the surface of the template, such as by glazing, application of a bond coat, or chemical etching. The chemical modification can improve the performance and/or stabilize the template surface. Removal of residual impurities, cleaning of the surface, reduction of residual stain distributions prior to coating, increasing the microscopic roughness of the surface to improve coating bond strength or removing and/or improving the morphology of protuberances. Furthermore, the modification can be achieved by the preferential removal of one or more constituent phases on the template. For example, a wash with caustic soda may dissolve silica from the template.

The present invention includes the following aspects/embodiments/features in any order and/or in any combination:

1. A proppant comprising a template sphere, said template sphere having a Krumbein sphericity of at least about 0.3 and a roundness of at least about 0.1, said proppant having a Krumbein sphericity of at least about 0.5 and a roundness of at least about 0.4, and a continuous sintered shell around the entire outer surface of said template sphere, wherein at least the outer surface of said template sphere comprises a glass-ceramic or a glass-ceramic containing layer in contact with said outer surface of said template sphere.

2. The proppant of any preceding or following embodiment/feature/aspect, wherein said template sphere is a solid sphere.

3. The proppant of any preceding or following embodiment/feature/aspect, wherein said template sphere is a hollow sphere.

4. The proppant of any preceding or following embodiment/feature/aspect, wherein said proppant comprises a continuous sintered shell around the entire outer surface of said template sphere or said glass-ceramic containing layer, and said shell comprises a ceramic material or oxide thereof.

5. The proppant of any preceding or following embodiment/feature/aspect, wherein the template sphere is entirely glass-ceramic.

6. The proppant of any preceding or following embodiment/feature/aspect, wherein said template sphere is a cenosphere.

7. The proppant of any preceding or following embodiment/feature/aspect, wherein said template sphere comprises ceramic and/or glass.

8. The proppant of any preceding or following embodiment/feature/aspect, wherein said template sphere comprises glass.

9. The proppant of any preceding or following embodiment/feature/aspect, wherein said proppant comprises said glass-ceramic containing layer that is in contact with said template sphere, and said glass-ceramic containing layer comprises a glass-ceramic which at least partially diffuses into the outer surface of said template sphere.

10. The proppant of any preceding or following embodiment/feature/aspect, wherein said outer surface has a thickness of from about 0.1 μm to about 1000 μm.

11. The proppant of any preceding or following embodiment/feature/aspect, wherein said glass-ceramic has a degree of crystallinity of from about 1% to about 100%.

12. The proppant of any preceding or following embodiment/feature/aspect, wherein said glass-ceramic has a degree of crystallinity of from about 60% to about 80%.

13. The proppant of any preceding or following embodiment/feature/aspect, wherein said glass-ceramic comprises crystallites having an orientation that is random.

14. The proppant of any preceding or following embodiment/feature/aspect, wherein said glass-ceramic comprises crystallites having an orientation that is non-random.

15. The proppant of any preceding or following embodiment/feature/aspect, wherein said glass-ceramic is capable of withstanding temperatures of up to about 800° C. to 1,500° C.

16. The proppant of any preceding or following embodiment/feature/aspect, wherein said proppant has at least one of the following properties:
   a) said template sphere has a coefficient of thermal expansion (CTE at from 25° C. to 300° C.) of from $0.1 \times 10^{-6}$/K to $13 \times 10^{-6}$/K; and/or
   b) said shell has a coefficient of thermal expansion (CTE at from 25° C. to 300° C.) of from $0.1 \times 10^{-6}$/K to $13 \times 10^{-6}$/K.

17. The proppant of any preceding or following embodiment/feature/aspect, wherein said proppant has a specific gravity of about 3 or less; and/or a coefficient of thermal expansion (CTE at from 25° C. to 300° C.) of from about $0.1 \times 10^{-6}$/K to about $13 \times 10^{-6}$/K; and/or a thermal conductivity of from about 0.01 W/m–K to about 3.0 W/m–K.

18. The proppant of any preceding or following embodiment/feature/aspect, wherein the proppant has a specific gravity of from about 0.7 to about 4.0.

19. The proppant of any preceding or following embodiment/feature/aspect, wherein the glass-ceramic has at least one of the following properties: a density of from about 1.5 to about 3.5 g/cm$^3$; a Young's Modulus of from about 50 to about 80 GPa; and/or a MOR of from about 50 to about 150 MPa.

20. The proppant of any preceding or following embodiment/feature/aspect, wherein template sphere has a MOR of from about 1 to about 100 MPa.

21. The proppant of any preceding or following embodiment/feature/aspect, wherein said glass-ceramic has at least one of the following properties:
   a) shear modulus (at 25° C.) of from about 20 to about 50 GPa;
   b) a modulus of rupture (at 25° C.) of from about 50 to about 150 MPa;
   c) a compressive strength of from about 300 MPa to about 500 MPa;
   d) a fracture toughness of from about 1 to about 10 MPa·m$^{1/2}$; or
   e) a thermal conductivity of from about 0.01 to about 3 W/(m·K).

22. The proppant of any preceding or following embodiment/feature/aspect, wherein said shell is a continuous shell having a thickness of from about 0.1 micrometers to 1000 micrometers, and said template sphere has a specific gravity of from about 0.01 to about 3, and said proppant has a crush strength of about 1,000 psi or greater, and said template sphere has a void volume % of at least 30%.

23. The proppant of any preceding or following embodiment/feature/aspect, wherein said template sphere has a sphericity of at least about 0.6, a continuous sintered shell around the entire outer surface of said template sphere, wherein said continuous shell has a substantially uniform thickness, and wherein said proppant has a crush strength of about 1,500 psi or greater, and said template sphere has a void volume % of at least 30%.

24. The proppant of any preceding or following embodiment/feature/aspect, wherein said template sphere comprises a mixture of aluminum oxide, silicon oxide, titanium oxide, iron oxide, magnesium oxide, calcium oxide, potassium oxide and sodium oxide.

25. The proppant of any preceding or following embodiment/feature/aspect, wherein said glass-ceramic of said template sphere comprises aluminum oxide, silicon oxide, boron oxide, potassium oxide, zirconium oxide, magnesium oxide, calcium oxide, titanium oxide or any combination thereof.

26. The proppant of any preceding or following embodiment/feature/aspect, wherein said glass-ceramic of said template sphere comprises from about 10% to about 55% by weight $SiO_2$; from about 0% to about 28% by weight $Al_2O_3$; from about 1% to about 5% by weight CaO; from about 7% to about 50% by weight MgO; from about 0.5% to about 25% by weight $TiO_2$; from about 0.4% to about 30% by weight $B_2O_3$, and greater than 0% and up to about 5% by weight $P_2O_5$, based on the weight of the glass-ceramic.

27. The proppant of any preceding or following embodiment/feature/aspect, wherein said glass-ceramic of said template sphere comprises from about 3% to about 10% by weight $Li_2O$; from about 0% to about 28% by weight $Al_2O_3$; from about 10% to about 55% by weight $SiO_2$; from about 7% to about 50% by weight MgO; from about 0.5% to about 25% by weight $TiO_2$; from about 0.4% to about 30% by weight $B_2O_3$, and from about 6% to about 20% by weight ZnO, based on the weight of the glass-ceramic.

28. The proppant of any preceding or following embodiment/feature/aspect, wherein said shell comprises aluminum oxide, silicon oxide, boron oxide, potassium oxide, zirconium oxide, magnesium oxide, calcium oxide, lithium oxide, sodium oxide, iron oxide, phosphorous oxide, and/or titanium oxide or any combination thereof.

29. The proppant of any preceding or following embodiment/feature/aspect, wherein said shell comprises silicon oxide, sodium oxide, potassium oxide, calcium oxide, zirconium oxide, aluminum oxide, lithium oxide, iron oxide, cordierite, spinel, spodumene, steatite, a silicate, a substituted alumino silicate clay or any combination thereof.

30. The proppant of any preceding or following embodiment/feature/aspect, wherein said shell comprises two or more layers, wherein one of the layers comprises said ceramic material or oxide thereof.

31. The proppant of any preceding or following embodiment/feature/aspect, wherein said shell comprises cordierite.

32. The proppant of any preceding or following embodiment/feature/aspect, wherein said shell comprises magnesium oxide, calcium oxide, cerium oxide, yttrium oxide, scandium oxide, titanium dioxide, or any combination thereof.

33. The proppant of any preceding or following embodiment/feature/aspect, wherein said shell comprises a metal oxide, a metal carbide, a metal nitride, a metal boride, a metal silicide or any combination thereof, derived from a silicon source, titanium source, tungsten source, zirconium source, aluminum source, boron source, or any combination thereof.

34. The proppant of any preceding or following embodiment/feature/aspect, wherein said shell is surface modified by applying at least one organic material to said shell.

35. The proppant of any preceding or following embodiment/feature/aspect, wherein said continuous sintered shell comprises glass-ceramic.

36. The proppant of any preceding or following embodiment/feature/aspect, wherein the glass-ceramic of said continuous sintered shell is different from the glass-ceramic of the template sphere.

37. The proppant of any preceding or following embodiment/feature/aspect, wherein the glass-ceramic of said continuous sintered shell is the same as the glass-ceramic of the template sphere.

38. The proppant of any preceding or following embodiment/feature/aspect, wherein the glass-ceramic is uniformly distributed in the continuous sintered shell and/or the template sphere.

39. The proppant of any preceding or following embodiment/feature/aspect, wherein the glass-ceramic is non-uniformly distributed in the continuous sintered shell and/or the template sphere.

40. The proppant of any preceding or following embodiment/feature/aspect, wherein the proppant size is from about 90 micrometers to about 2,000 micrometers.

41. The proppant of any preceding or following embodiment/feature/aspect, wherein the template sphere has a size of from about 20 micrometers to about 1,000 micrometers.

42. The proppant of any preceding or following embodiment/feature/aspect, wherein the crystallite size of the glass-ceramic is from about 0.1 to about 0.5 micrometers.

43. The proppant of any preceding or following embodiment/feature/aspect, wherein the crystallite size of the glass-ceramic is less than 1 micron.

44. The proppant of any preceding or following embodiment/feature/aspect, wherein the proppant is rod-, pillar-, spike-, gear-, donut-, cylinder-, polygon- or peanut-shaped.

45. The proppant of any preceding or following embodiment/feature/aspect, wherein the proppant comprises a shape having an aspect ratio of 1.

46. A proppant comprising a sphere, said sphere having a Krumbein sphericity of at least about 0.3 and a roundness of at least about 0.1, said proppant having a Krumbein sphericity of at least about 0.5 and a roundness of at least about 0.4, wherein at least the outer surface of said sphere comprises a glass-ceramic or a glass-ceramic containing layer in contact with said outer surface of said sphere.

47. The proppant of any preceding or following embodiment/feature/aspect, wherein said sphere comprises ceramic and/or glass.

48. The proppant of any preceding or following embodiment/feature/aspect, wherein the entire sphere is glass-ceramic.

49. The proppant of any preceding or following embodiment/feature/aspect, wherein said proppant comprises said glass-ceramic containing layer that is in contact with said template sphere, and said glass-ceramic containing layer comprises a glass-ceramic which at least partially diffuses into the outer surface of said template sphere.

50. The proppant of any preceding or following embodiment/feature/aspect, wherein said outer surface has a thickness of from about 0.1 to about 1000 μm.

51. The proppant of any preceding or following embodiment/feature/aspect, wherein said glass-ceramic comprises from about 1% to about 100% crystallinity.

52. The proppant of any preceding or following embodiment/feature/aspect, wherein said glass-ceramic comprises from about 10% to about 100% crystallinity.

53. The proppant of any preceding or following embodiment/feature/aspect, wherein said glass-ceramic comprises crystallites having an orientation that is random.

54. The proppant of any preceding or following embodiment/feature/aspect, wherein said glass-ceramic comprises crystallites having an orientation that is non-random.

55. The proppant of any preceding or following embodiment/feature/aspect, wherein said glass-ceramic is capable of withstanding temperatures of up to about 800° C. to 1,500° C.

56. The proppant of any preceding or following embodiment/feature/aspect, wherein said proppant has at least one of the following properties: said template sphere has a coefficient of thermal expansion (CTE at from 25° C. to 300° C.) of from about $0.1 \times 10^{-6}$/K to about $13 \times 10^{-6}$/K.

57. The proppant of any preceding or following embodiment/feature/aspect, wherein said proppant has a specific gravity of about 3 or less; and a thermal conductivity of from about 0.01 W/(m–K) to about 3.0 W/(m–K).

58. The proppant of any preceding or following embodiment/feature/aspect, wherein the proppant has at least one of the following properties: a density of from about 1.5 to about 3.0 g/cm$^3$; and/or a Young's Modulus of from about 50 to about 80 GPa; and/or a MOR of from about 50 to about 150 MPa 59. The proppant of any preceding or following embodiment/feature/aspect, wherein template sphere has a MOR of from about 1 to about 100 MPa.

60. The proppant of any preceding or following embodiment/feature/aspect, wherein said proppant has at least one of the following properties; shear modulus (at 25° C.) of from about 20 to about 50 GPa; a modulus of rupture (at 25° C.) of from about 50 to about 150 MPa; a compressive strength of from about 300 MPa to about 500 MPa; a fracture toughness of from about 1 to about 10 MPa·m$^{1}$/2; a thermal conductivity of from about 0.01 to about 3 W/(m·K).

61. The proppant of any preceding or following embodiment/feature/aspect, wherein said template sphere has a specific gravity of from about 0.01 to about 3, and said proppant has a crush strength of about 20 kpsi or greater, and said template sphere has a void volume % of at least 30%.

62. The proppant of any preceding or following embodiment/feature/aspect, wherein said template sphere has a sphericity of at least about 0.6, a continuous sintered shell around the entire outer surface of said template sphere, wherein said continuous shell has a substantially uniform thickness, and wherein said proppant has a crush strength of about 1,500 psi or greater, and said template sphere has a void volume % of at least 30%.

63. The proppant of any preceding or following embodiment/feature/aspect, wherein said proppant comprises from about 10% to about 55% by weight SiO$_2$; from about 0% to about 28% by weight Al$_2$O$_3$; from about 1% to about 5% by weight CaO; from about 7% to about 50% by weight MgO; from about 0.5% to about 25% by weight TiO$_2$; from about 0.4% to about 30% by weight B$_2$O$_3$, and greater than 0% and up to about 5% by weight P$_2$O$_5$, based on the weight of the glass-ceramic.

64. The proppant of any preceding or following embodiment/feature/aspect, wherein said sphere is a solid sphere.

65. The proppant of any preceding or following embodiment/feature/aspect, wherein said sphere is a hollow sphere.

66. A method of forming the proppant, comprising providing a template sphere comprising glass; optionally hardening the template sphere; crystallizing at least an outer surface of said template sphere by heat treatment to form an outer surface comprising glass-ceramic; and, optionally, providing a shell around the entire outer surface of said template sphere; and sintering said shell to form a continuous sintered shell.

67. The method of any preceding or following embodiment/feature/aspect, wherein said heat treatment comprises heating said template sphere to a temperature of from about 500° C. to about 1,500° C.

68. The method of any preceding or following embodiment/feature/aspect, further comprising applying on said template sphere, a composition comprising alkali earth metals or transitional metal oxides prior to subjecting said template sphere to heat treatment.

69. The method of any preceding or following embodiment/feature/aspect, further comprising conducting said heat treatment in the presence of at least one crystal initiator.

70. The method of any preceding or following embodiment/feature/aspect, wherein the proppant formed is rod-, pillar-, spike-, gear-, donut-, cylinder-, polygon- or peanut-shaped.

71. The method of any preceding or following embodiment/feature/aspect, wherein the proppant shape is achieved by extrusion or fluid bed coating, or granulating, or pelletizing.

72. The method of any preceding or following embodiment/feature/aspect, wherein the proppant shape is achieved by using a fluid bed granulator, a fluid spray dryer, or a pelletizer.

73. A proppant comprising a template sphere, said template sphere having a Krumbein sphericity of at least about 0.3 and a roundness of at least about 0.1, said proppant having a Krumbein sphericity of at least about 0.5 and a roundness of at least about 0.4, and a continuous sintered shell around the entire outer surface of said template sphere, wherein at least the continuous sintered shell comprises a glass-ceramic.

74. The proppant of any preceding or following embodiment/feature/aspect, wherein said template sphere comprises a glass-ceramic.

75. The proppant of any preceding or following embodiment/feature/aspect, wherein the glass-ceramic in the template sphere and/or the shell is in solid form.

76. The proppant of any preceding or following embodiment/feature/aspect, wherein the glass-ceramic in the template sphere and/or shell is in hollow or porous form.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1

A proppant according to the present invention can be prepared by coating conventional glass cenospheres with alkali metals. The alkali metals can be dip-coated, spin coated, and spray-coated onto the glass cenospheres. Alternatively, the cenospheres can be doped with transitional metal oxides. Once the cenospheres are coated or doped, as described, they are subjected to heat treatment for crystallization. The cenospheres are heated to temperatures of 500° C. to 1,000° C. for a period of time sufficient to crystallize at least an outer surface of the cenospheres. The amount of time in which the cenospheres are heated can vary depending on the degree of crystallization desired. The cenospheres can be heated, for example, for a period of about 30 minutes to 12 hours, or from 2 hours to 10 hours. If full crystallization of the cenospheres is desired, the cenospheres should be heated for a fraction of an hour to several hours, for example, 0.1 to 10 hours or more.

Once the desired crystallization is achieved, the cenospheres can be coated with a ceramic shell, such as cordierite. The cordierite can be granulated or pelletized through a granulator to achieve particles of about 200 micrometers in diameter or larger. The formed cordierite particles are then dried and used to coat the cenospheres which have at least a glass-ceramic outer layer. The cenospheres are then sintered. The sintering can be conducted in a conventional manner, known in the art. For example, the coated cenospheres can be fired at temperatures of about 1,200° C. to about 1,450° C., preferably 1,250° C. to 1,420° C. to form a sintered cordierite proppant.

Example 2

TABLE 1

Chemical compositions (in wt %) of two cenosphere samples used for glass-ceramic synthesis

| $SiO_2$ | $Al_2O_3$ | $Fe_2O_3$ | MgO | CaO | $Na_2O$ | $K_2O$ | $TiO_2$ | $P_2O_5$ | MnO |
|---|---|---|---|---|---|---|---|---|---|
| 62.05 | 23.40 | 5.89 | 1.49 | 1.52 | 1.18 | 2.61 | 0.98 | 0.21 | 0.06 |
| 59.29 | 26.12 | 3.02 | 1.3 | 3.62 | 2.13 | 1.25 | 0.61 | 0.06 | 0.02 |

The two cenosphere samples above were each reduced to powder so as to have an average particle size of approximately 6 μm. Then, circular pellets (spheres) were made with each of the powders, wherein some of the powder mixtures had various levels of $TiO_2$ added as shown in FIG. 1. The circular pellets were then sintered at 1200° C. for 4 h. The results are set forth in FIGS. 1-3 and Table 2. As shown, the addition of $TiO_2$ was very effective in strength improvement. FIG. 1 shows the density as a function of $TiO_2$ content. As can be seen in FIGS. 2 and 3, the strength of the samples increased steeply with a general increase of $TiO_2$ content, but there is a valley at 13 wt % $TiO_2$. The maximum strength was observed at 13 wt % $TiO_2$. The strength was more than doubled. It is believed that the increase of strength was due to the transformation of glass to glass-ceramics.

TABLE 2

Strength improvement by glass-ceramic formation from cenosphere over the control (0% $TiO_2$) for the samples sintered at 1200° C. for 4 h, from the data shown in FIG. 2

| $TiO_2$, wt. % | Strength, psi | Std. dev. | Net increase, % |
|---|---|---|---|
| 0 | 1774 | 352 | 0 |
| 2 | 2433 | 206 | 37 |
| 5 | 3623 | 310 | 104 |
| 7 | 4447 | 808 | 151 |
| 9 | 3119 | 754 | 76 |
| 11 | 5070 | 331 | 186 |
| 13 | 2744 | 503 | 55 |
| 17 | 3717 | 840 | 110 |
| 20 | 4076 | 1148 | 130 |
| 23 | 4018 | 459 | 126 |

Example 3

In this example, additional proppants were prepared using the first cenosphere powder in Table 1 with cordierite. In particular, the mixture (before taking into account the amount of the $TiO_2$ present) was composed of 25 wt % cenosphere powder and 75 wt % cordierite and this mixture was formed into spheres, with the indicated additions of $TiO_2$, and sintered at 1260° C. for 6 h. The density and strength data of the samples are set forth in Table 3. The splitting strength of the composite increased gradually with the content of the $TiO_2$ and reached the maximum at 7 wt % $TiO_2$. The amount of $TiO_2$ is based on the total weight of the pellet or sphere. The strength at this $TiO_2$ level was more than doubled (108% net strength increase over the control) higher than the sample without any $TiO_2$. The strength increase is mainly attributed to the glass-ceramic formation in the cenosphere powder. With the $TiO_2$ content increase, the strength of these 1260° C. sintered composite samples increased and then reached a maximum point and then dropped down, although the density kept increasing. This is so because when the $TiO_2$ reached a certain level, further increasing of $TiO_2$ would simply decrease the relative content of cenosphere powder. Again, this indicates the contribution of glass-ceramics from the cenosphere in the composite. The microstructures of the composites of 25%:75% cenosphere-cordierite matrix without and with 7 wt % TiO$_2$ are shown in FIG. 4. It is seen that the sample with 7 wt % TiO$_2$ is denser than without TiO$_2$.

TABLE 3

Density and diametral splitting strength of the glass-ceramics in the matrix of 25% cenosphere-75% cordierite. All the samples were sintered at 1260° C. for 6 h.

| TiO$_2$ (wt. %) | Density (g/cm$^3$) | Strength (psi) | Specific strength (psi) | Net strength increase (%) | Net specific str. increase (%) |
| --- | --- | --- | --- | --- | --- |
| 0 | 2.19 | 3229 | 1474 | 0 | 0 |
| 2.5 | 2.31 | 5063 | 2192 | 57 | 49 |
| 5 | 2.39 | 5011 | 2097 | 55 | 42 |
| 7 | 2.45 | 6716 | 2741 | 108 | 86 |
| 11 | 2.50 | 5565 | 2226 | 72 | 51 |
| 13 | 2.53 | 4841 | 1913 | 50 | 30 |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A proppant comprising a template sphere, said template sphere having a Krumbein sphericity of at least about 0.3 and a roundness of at least about 0.1, said proppant having a Krumbein sphericity of at least about 0.5 and a roundness of at least about 0.4, and a continuous sintered shell around the entire outer surface of said template sphere, wherein at least the outer surface of said template sphere comprises a glass-ceramic or a glass-ceramic containing layer in contact with said outer surface of said template sphere.

2. The proppant of claim 1, wherein said proppant comprises a continuous sintered shell around the entire outer surface of said template sphere or said glass-ceramic containing layer, and said shell comprises a ceramic material or oxide thereof.

3. The proppant of claim 2, wherein said template sphere has a sphericity of at least about 0.6, a continuous sintered shell around the entire outer surface of said template sphere, wherein said continuous shell has a substantially uniform thickness, and wherein said proppant has a crush strength of about 1,500 psi or greater, and said template sphere has a void volume % of at least 30%.

4. The proppant of claim 1, wherein said glass-ceramic of said template sphere comprises aluminum oxide, silicon oxide, boron oxide, potassium oxide, zirconium oxide, magnesium oxide, calcium oxide, titanium oxide or any combination thereof.

5. The proppant of claim 4, wherein said glass-ceramic of said template sphere comprises from about 10% to about 55% by weight SiO$_2$; from about 0% to about 28% by weight Al$_2$O$_3$; from about 1% to about 5% by weight CaO; from about 7% to about 50% by weight MgO; from about 0.5% to about 25% by weight TiO$_2$; from about 0.4% to about 30% by weight B$_2$O$_3$, and greater than 0% and up to about 5% by weight P$_2$O$_5$, based on the weight of the glass-ceramic.

6. The proppant of claim 4, wherein said glass-ceramic of said template sphere comprises from about 3% to about 10% by weight Li$_2$O; from about 0% to about 28% by weight Al$_2$O$_3$; from about 10% to about 55% by weight SiO$_2$; from about 7% to about 50% by weight MgO; from about 0.5% to about 25% by weight TiO$_2$; from about 0.4% to about 30% by weight B$_2$O$_3$, and from about 6% to about 20% by weight ZnO, based on the weight of the glass-ceramic.

7. The proppant of claim 1, wherein said continuous sintered shell comprises glass-ceramic.

8. The proppant of claim 7, wherein the glass-ceramic of said continuous sintered shell is different from the glass-ceramic of the template sphere.

9. The proppant of claim 7, wherein the glass-ceramic of said continuous sintered shell is the same as the glass-ceramic of the template sphere.

10. The proppant of claim 7, wherein the glass-ceramic is uniformly distributed in the continuous sintered shell and/or the template sphere.

11. The proppant of claim 7, wherein the glass-ceramic is non-uniformly distributed in the continuous sintered shell and/or the template sphere.

12. The proppant of claim 1, wherein said template sphere is a solid sphere.

13. The proppant of claim 1, wherein said template sphere is a hollow sphere.

14. The proppant of claim 1, wherein the template sphere is entirely glass-ceramic.

15. The proppant of claim 1, wherein said template sphere is a cenosphere.

16. The proppant of claim 1, wherein said template sphere comprises ceramic and/or glass.

17. The proppant of claim 1, wherein said template sphere comprises glass.

18. The proppant of claim 1, wherein said proppant comprises said glass-ceramic containing layer that is in contact with said template sphere, and said glass-ceramic containing layer comprises a glass-ceramic which at least partially diffuses into the outer surface of said template sphere.

19. The proppant of claim 1, wherein said outer surface has a thickness of from about 0.1 μm to about 1000 μm.

20. The proppant of claim 1, wherein said glass-ceramic has a degree of crystallinity of from about 1% to about 100%.

21. The proppant of claim 1, wherein said glass-ceramic has a degree of crystallinity of from about 60% to about 80%.

22. The proppant of claim 1, wherein said glass-ceramic comprises crystallites having an orientation that is random.

23. The proppant of claim 1, wherein said glass-ceramic comprises crystallites having an orientation that is non-random.

24. The proppant of claim 1, wherein said glass-ceramic is capable of withstanding temperatures of up to about 1,500° C.

25. The proppant of claim 1, wherein said proppant has at least one of the following properties:
   a) said template sphere has a coefficient of thermal expansion at from 25° C. to 300° C. of from $0.1 \times 10^{-6}$/K to $13 \times 10^{-6}$/K ; and/or
   b) said shell has a coefficient of thermal expansion at from 25° C. to 300° C. of from $0.1 \times 10^{-6}$/K to $13 \times 10^{-6}$/K.

26. The proppant of claim 1, wherein said proppant has a specific gravity of about 3 or less; and/or a coefficient of thermal expansion at from 25° C. to 300° C. of from about $0.1 \times 10^{-6}$/K to about $13 \times 10^{-6}$/K ; and/or a thermal conductivity of from about 0.01 W/m–K to about 3.0 W/m–K.

27. The proppant of claim 1, wherein the proppant has a specific gravity of from about 0.7 to about 4.0.

28. The proppant of claim 1, wherein the glass-ceramic has at least one of the following properties: a density of from about 1.5 to about 3.5 g/cm³; a Young's Modulus of from about 50 to about 80 GPa; and/or a modulus of rigidity of from about 50 to about 150 MPa.

29. The proppant of claim 1, wherein said template sphere has a modulus of rigidity of from about 1 to about 100 MPa.

30. The proppant of claim 1, wherein said glass-ceramic has at least one of the following properties:
   a) shear modulus at 25° C. of from about 20 to about 50 GPa;
   b) a modulus of rupture at 25° C. of from about 50 to about 150 MPa;
   c) a compressive strength of from about 300 MPa to about 500 MPa;
   d) a fracture toughness of from about 1 to about 10 MPa·m$^{1/2}$; or
   e) a thermal conductivity of from about 0.01 to about 3 W/(m·K).

31. The proppant of claim 1, wherein said shell is a continuous shell having a thickness of from about 0.1 micrometers to 1000 micrometers, and said template sphere has a specific gravity of from about 0.01 to about 3, and said proppant has a crush strength of about 1,000 psi or greater, and said template sphere has a void volume % of at least 30%.

32. The proppant of claim 1, wherein said template sphere comprises a mixture of aluminum oxide, silicon oxide, titanium oxide, iron oxide, magnesium oxide, calcium oxide, potassium oxide and sodium oxide.

33. The proppant of claim 1, wherein said shell comprises aluminum oxide, silicon oxide, boron oxide, potassium oxide, zirconium oxide, magnesium oxide, calcium oxide, lithium oxide, sodium oxide, iron oxide, phosphorous oxide, and/or titanium oxide or any combination thereof.

34. The proppant of claim 1, wherein said shell comprises silicon oxide, sodium oxide, potassium oxide, calcium oxide, zirconium oxide, aluminum oxide, lithium oxide, iron oxide, cordierite, spinel, spodumene, steatite, a silicate, a substituted alumino silicate clay or any combination thereof.

35. The proppant of claim 1, wherein said shell comprises two or more layers, wherein one of the layers comprises said ceramic material or oxide thereof.

36. The proppant of claim 1, wherein said shell comprises cordierite.

37. The proppant of claim 1, wherein said shell comprises magnesium oxide, calcium oxide, cerium oxide, yttrium oxide, scandium oxide, titanium dioxide, or any combination thereof.

38. The proppant of claim 1, wherein said shell comprises a metal oxide, a metal carbide, a metal nitride, a metal boride, a metal silicide or any combination thereof, derived from a silicon source, titanium source, tungsten source, zirconium source, aluminum source, boron source, or any combination thereof.

39. The proppant of claim 1, wherein said shell is surface modified by applying at least one organic material to said shell.

40. The proppant of claim 1, wherein the proppant size is from about 90 micrometers to about 2,000 micrometers.

41. The proppant of claim 1, wherein the template sphere has a size of from about 20 micrometers to about 1,000 micrometers.

42. The proppant of claim 1, wherein the crystallite size of the glass-ceramic is from about 0.1 to about 0.5 micrometers.

43. The proppant of claim 1, wherein the crystallite size of the glass-ceramic is less than 1 micron.

44. The proppant of claim 1, wherein the proppant is rod-, pillar-, spike-, gear-, donut-, cylinder-, polygon- or peanut-shaped.

45. The proppant of claim 1, wherein the proppant comprises a shape having an aspect ratio of 1.

46. A proppant comprising a sphere, said sphere having a Krumbein sphericity of at least about 0.3 and a roundness of at least about 0.1, said proppant having a Krumbein sphericity of at least about 0.5 and a roundness of at least about 0.4, wherein at least the outer surface of said sphere comprises a glass-ceramic or a glass-ceramic containing layer in contact with said outer surface of said sphere.

47. The proppant of claim 46, wherein said sphere comprises ceramic and/or glass.

48. The proppant of claim 46, wherein the entire sphere is glass-ceramic.

49. The proppant of claim 46, wherein said proppant comprises said glass-ceramic containing layer that is in contact with said sphere, and said glass-ceramic containing layer comprises a glass-ceramic which at least partially diffuses into the outer surface of said sphere.

50. The proppant of claim 46, wherein said outer surface has a thickness of from about 0.1 to about 1000 μm.

51. The proppant of claim 46, wherein said glass-ceramic comprises from about 1% to about 100% crystallinity.

52. The proppant of claim 46, wherein said glass-ceramic comprises from about 10% to about 100% crystallinity.

53. The proppant of claim 46, wherein said glass-ceramic comprises crystallites having an orientation that is random.

54. The proppant of claim 46, wherein said glass-ceramic comprises crystallites having an orientation that is non-random.

55. The proppant of claim 46, wherein said glass-ceramic is capable of withstanding temperatures of up to about 1,500° C.

56. The proppant of claim 46, wherein said sphere has a coefficient of thermal expansion at from 25° C. to 300° C. of from about $0.1 \times 10^{-6}$/K to about $13 \times 10^{-6}$/K.

57. The proppant of claim 46, wherein said proppant has a specific gravity of about 3 or less; and a thermal conductivity of from about 0.01 W/(m–K) to about 3.0 W/(m–K).

58. The proppant of claim 46, wherein the proppant has at least one of the following properties: a density of from about 1.5 to about 3.0 g/cm3; and/or a Young's Modulus of from about 50 to about 80 GPa; and/or a modulus of rigidity of from about 50 to about 150 MPa.

59. The proppant of claim 46, wherein template sphere has a modulus of rigidity of from about 1 to about 100 MPa.

60. The proppant of claim 46, wherein said proppant has at least one of the following properties: shear modulus at 25° C. of from about 20 to about 50 GPa; a modulus of rupture at 25° C. of from about 50 to about 150 MPa; a compressive strength of from about 300 MPa to about 500 MPa; a fracture toughness of from about 1 to about 10 MPa·m$^{1/2}$; a thermal conductivity of from about 0.01 to about 3 W/(m·K).

61. The proppant of claim 46, wherein said sphere has a specific gravity of from about 0.01 to about 3, and said proppant has a crush strength of about 20 kpsi or greater, and said sphere has a void volume % of at least 30%.

62. The proppant of claim 46, wherein said sphere has a sphericity of at least about 0.6, a continuous sintered shell around the entire outer surface of said sphere, wherein said continuous shell has a substantially uniform thickness, and wherein said proppant has a crush strength of about 1,500 psi or greater, and said sphere has a void volume % of at least 30%.

63. The proppant of claim 46, wherein said proppant comprises from about 10% to about 55% by weight $SiO_2$; from about 0% to about 28% by weight $Al_2O_3$; from about 1% to about 5% by weight CaO; from about 7% to about 50% by weight MgO; from about 0.5% to about 25% by weight $TiO_2$; from about 0.4% to about 30% by weight $B_2O_3$, and greater than 0% and up to about 5% by weight $P_2O_5$, based on the weight of the glass-ceramic.

64. The proppant of claim 46, wherein said sphere is a solid sphere.

65. The proppant of claim 46, wherein said sphere is a hollow sphere.

66. A method of forming a proppant, comprising providing a template sphere comprising glass; optionally hardening the template sphere; crystallizing at least an outer surface of said template sphere by heat treatment to form an outer surface comprising glass-ceramic; and, optionally, providing a shell around the entire outer surface of said template sphere; and sintering said shell to form a continuous sintered shell.

67. The method of claim 66, further comprising applying on said template sphere, a composition comprising alkali earth metals or transitional metal oxides prior to subjecting said template sphere to heat treatment.

68. The method of claim 67, further comprising conducting said heat treatment in the presence of at least one crystal initiator.

69. The method of claim 66, wherein said heat treatment comprises heating said template sphere to a temperature of from about 500° C. to about 1,500° C.

70. The method of claim 66, wherein the proppant formed is rod-, pillar-, spike-, gear-, donut-, cylinder-, polygon- or peanut-shaped.

71. The method of claim 66, wherein the proppant has a shape achieved by extrusion or fluid bed coating, or granulating, or pelletizing.

72. The method of claim 66, wherein the proppant has a shape achieved by fluid bed granulating or fluid spray drying.

73. A proppant comprising a template sphere, said template sphere having a Krumbein sphericity of at least about 0.3 and a roundness of at least about 0.1, said proppant having a Krumbein sphericity of at least about 0.5 and a roundness of at least about 0.4, and a continuous sintered shell around the entire outer surface of said template sphere, wherein at least the continuous sintered shell comprises a glass-ceramic.

74. The proppant of claim 73, wherein said template sphere comprises a glass-ceramic.

75. The proppant of claim 74, wherein the glass-ceramic in the template sphere and/or the shell is in solid form.

76. The proppant of claim 74, wherein the glass-ceramic in the template sphere and/or shell is in hollow or porous form.

* * * * *